(12) United States Patent
Jacot et al.

(10) Patent No.: US 10,507,528 B2
(45) Date of Patent: Dec. 17, 2019

(54) LATHE COMPRISING A GUIDE BUSH

(71) Applicant: Watch Out SA, Geneva (CH)

(72) Inventors: Philippe Jacot, Bevaix (CH); Sebastien Laporte, Thyez (FR)

(73) Assignee: WATCH OUT SA, Genève (CH)

( * ) Notice: Subject to any disclaimer, the term of this patent is extended or adjusted under 35 U.S.C. 154(b) by 44 days.

(21) Appl. No.: 15/580,789

(22) PCT Filed: Jun. 9, 2016

(86) PCT No.: PCT/IB2016/053385
§ 371 (c)(1),
(2) Date: Dec. 8, 2017

(87) PCT Pub. No.: WO2016/199047
PCT Pub. Date: Dec. 15, 2016

(65) Prior Publication Data
US 2019/0111492 A1    Apr. 18, 2019

(30) Foreign Application Priority Data

Jun. 11, 2015 (CH) .................................. 00833/15

(51) Int. Cl.
*B23B 13/02* (2006.01)
*G04D 1/00* (2006.01)
*B23B 7/06* (2006.01)

(52) U.S. Cl.
CPC .............. *B23B 13/022* (2013.01); *B23B 7/06* (2013.01); *G04D 1/0078* (2013.01)

(58) Field of Classification Search
CPC ........... B23B 7/06; B23B 13/02; B23B 25/00; B23B 13/022; G04D 1/0078; B23Q 1/763
See application file for complete search history.

(56) References Cited

U.S. PATENT DOCUMENTS

| | | | |
|---|---|---|---|
| 2002/0183888 A1* | 12/2002 | Sasaki | ..................... B23B 13/02 700/159 |
| 2007/0151429 A1* | 7/2007 | Nakaya | .................. B23B 13/021 82/126 |

(Continued)

FOREIGN PATENT DOCUMENTS

| | | |
|---|---|---|
| CH | 408591 A | 2/1966 |
| EP | 0463433 A1 | 1/1992 |

(Continued)

OTHER PUBLICATIONS

International Search Report for PCT/IB2016/053385 dated Sep. 5, 2016.

*Primary Examiner* — Sara Addisu
(74) *Attorney, Agent, or Firm* — Pearne & Gordon LLP (57) ABSTRACT

A lathe including a moving headstock designed to rotate and move forward a workpiece to be turned in relation to an axis of translation and rotation. A guide bush is designed to be attached to a frame of the lathe and includes a bush spindle and a clamping mechanism. The guide bush is designed to operate either in bush mode or in grip mode and is designed to be moveable axially in relation to the frame along the axis of translation and rotation. The lathe is arranged to operate in a first mode in which the guide bush is driven axially by the moving headstock, and a second mode in which the axial position of the guide bush is static in relation to the frame.

22 Claims, 10 Drawing Sheets

(56) References Cited

U.S. PATENT DOCUMENTS

2007/0224007 A1* 9/2007 Shinohara ............. B23B 13/022
 408/146
2007/0227317 A1* 10/2007 Asahara .................. B23B 3/161
 82/119
2011/0179918 A1* 7/2011 Baumann .................. B23B 7/06
 82/147

FOREIGN PATENT DOCUMENTS

| EP | 1698416 A1 | | 9/2006 | |
|----|-----------|---|--------|---|
| EP | 1704950 A1 | | 9/2006 | |
| JP | S61103705 A | | 5/1986 | |
| JP | 04115804 A | * | 4/1992 | ........... B23B 13/024 |
| JP | 11010405 A | * | 1/1999 | |

* cited by examiner

LATHE COMPRISING A GUIDE BUSH

TECHNICAL DOMAIN

The present invention relates to a guide bush and a lathe having a guide bush with a gripper or clamping mechanism.

PRIOR ART

A lathe is a machine tool that is used to machine mechanical parts by means of chip removal.

There is a wide range of lathes and lathe equipment, each covering and being suited to a range of different machining operations.

Document EP0463433 describes a lathe fitted with a guide bush attached to the frame and designed to adjust its internal diameter in order to provide a variable clamping of the bar, from a light clamping for precision machining to a hard clamping to enable operations involving high pressures, for example when knurling, when no forward movement is necessary.

Document CH408591 discloses an automatic lathe including a guide bush and a bushing clamp attached to the frame and a moving headstock. The automatic lathe includes means to enable the forward movement of the bar concurrently while holding the bar using the gripper attached to the frame while moving the moving headstock backwards in unclamped mode.

Document JP61103705 describes a lathe for machining long, small diameter parts that includes a carriage that is moveable along the axis of rotation of the part and bearing a guide bush and the machine tool.

Documents EP1698416 and EP1704950 relate to an automatic lathe that can be switched from a mode for machining the material with a guide bush to a mode for machining the material without the guide bush.

These lathes reveal an intention to design lathes that provide improved machining performance to the operator.

There is currently increasing demand on the market for an automatic or semi-automatic multi-purpose lathe designed to provide greater flexibility in terms of the range of machining operations available and the types of parts that can be machined, while guaranteeing high machining efficiency and effectiveness.

BRIEF SUMMARY OF THE INVENTION

One objective of the present invention is to propose a multi-purpose lathe that supports a wider range of machining operations than the prior art.

Another objective of the invention is to propose a lathe that enables the machining of different types of parts, notably parts that have a very high length/diameter ratio, for example greater than 4.

Another objective of the invention is to propose a lathe that provides efficient machining of parts in small and large series.

According to the invention, these objectives are achieved notably by means of a lathe including:
  a moving headstock designed to ensure the rotation and translation of a part to be machined in relation to an axis of translation and rotation,
  a guide bush designed to be attached to a frame of the lathe and including a bush spindle and a gripper or a clamping mechanism, the guide bush being designed to operate either in bush mode or in grip mode, wherein the guide bush is designed to be moveable axially in relation to the frame along said axis of translation and rotation,
  the lathe is designed to operate in a first mode in which the guide bush is driven axially by the moving headstock, and
  the lathe is designed to operate in a second mode in which the axial position of the guide bush is static in relation to the frame.

According to the disclosure, the term moving headstock refers to a spindle designed to hold a portion of a part to be machined and to rotate same and to move same in translation axially in relation to an axis of rotation and translation.

According to the disclosure, the terms axial and radial refer to the axis of rotation and translation of the part. This terminology is used throughout the description to facilitate comprehension thereof.

According to the disclosure, the term "guide bush" refers to a supporting element used to guide an end portion of a part to be machined, said supporting element being separated from the moving headstock on the axis of rotation (axis of forward movement of the part to be machined).

According to the disclosure, the term "bush spindle" refers to a spindle designed to axially guide a portion of a part to be machined and to hold same radially in relation to an axis of rotation and translation of the part to be machined, while performing a rotational movement.

According to the disclosure, the term "gripper or clamping mechanism" refers to any element or element portion that is activatable/disactivatable and designed to act on a part in order to prevent any relative movement of the part in relation to said element or element portion.

According to one embodiment, the gripper or clamping mechanism of the bush is positioned coaxially in relation to the bush spindle.

According to one embodiment, the gripper or clamping mechanism of the bush is designed to operate in a cavity or in an internal passage of the bush spindle.

According to the disclosure, the expression "the guide bush operating in bush mode" means the bush operating with the gripper or clamping mechanism released such that the part to be machined is free to move axially in relation to the guide bush while the free end portion thereof is supported and/or guided by the bush spindle.

According to the disclosure, the expression "the guide bush operating in grip mode" means the bush operating with the gripper or clamping mechanism clamped around a portion of a part to be machined such as to prevent any axial translational movement of the part in relation to the guide bush.

The part to be machined may be a feed bar.

This solution notably has the advantage over the prior art of providing a lathe offering all of the advantages of the following systems:
  a lathe with a guide bush that is static in relation to the frame, notably with a bar feed device,
  a lathe with a bushing clamp that is moveable axially in relation to the frame, and
  a lathe with a moving headstock (or bar lathe/turning machine).

This solution notably has the advantage over the prior art of providing a lathe enabling the following:
  machining in guide bush mode, notably with continuous forward movement of the part to be machined, notably with a backward movement of the moving headstock that can be implemented in concurrent operation time, precision machining holding one end of the part to be machined close to the machining zone, notably with an axial movement of the part to be machined.

This solution provides the notable advantage over the prior art of making it possible to change, automatically or semi-automatically, the machining mode during machining of a part, without having to replace, insert or substitute components of the lathe. Depending on the type of machining, the machining mode can optionally be changed in concurrent operation time.

According to one embodiment, the guide bush is motorized.

According to one embodiment, all or at least a part of the guide bush including the bush spindle and/or the gripper or clamping mechanism of the bush is detachable from the frame. Preferably, all or said part of the guide bush is detachably axially along the axis of rotation and translation of the part. Optionally, all or said part of the guide bush is detachable from the side of the frame that is oriented towards the machining zone, i.e. towards the working position of the tool or tools of the lathe.

This solution provides the notable advantage over the prior art of offering not only the rapid and easy swapping or replacement of the bush spindle and/or the gripper or clamping mechanism in the event of failure or during maintenance work, but also makes it possible to change these components as a function of the type of machining and/or the type of parts to be machined. For example, the bush spindle and/or the gripper or clamping mechanism of the bush may be chosen from a range of spindles/grippers that satisfy specific requirements of a specific type of machining, for example the dimensional requirements of parts (diameter, length) or requirements relating to the material being machined (rigidity, density, elasticity).

This solution also has the advantage over the prior art of making it possible to reallocate a lathe to produce a specific series of parts by simply assembling the guide bush or the bush spindle and/or the gripper that is associated with the production of said series. This advantage is noteworthy when the place of production includes a plurality of lathes distributed over several sites that are geographically separated. In this case, simply transporting the guide bush from one lathe to another, respectively from one site to another, enables the continuation or restarting of production of the series of parts.

According to one embodiment, the lathe includes a sheath radially surrounding, at least in part, the bush spindle and/or the gripper or clamping mechanism. The sheath is designed to be linked to the frame by a link enabling the axial translational movement of same in relation to the frame. According to one embodiment, the link is a sliding link. According to another embodiment, the link is a sliding pivoting link.

This solution notably has the advantage over the prior art of providing a guide bush that is compact, transportable and detachable.

According to one optional embodiment, the lathe includes a first coupling device,
the first coupling device being engageable/disengageable and operating between the guide bush and the moving headstock, and
the first coupling device being designed to axially couple the guide bush and the moving headstock along the axis of translation and rotation of the part.

According to an optional embodiment, the first coupling device operates between an end portion of the sheath of the bush and an end portion of the moving headstock.

According to an optional embodiment, the first coupling device is designed to keep the distance between the sheath of the bush and the moving headstock constant during the axial movements and equal to the distance between the sheath of the bush and the moving headstock when coupling takes place.

This solution has the notable advantage over the prior art of providing a lathe in which the bush spindle and the gripper or clamping mechanism of the bush are designed to be driven axially by the moving headstock, while keeping the relative distance between these elements constant and equal to the distance when coupling takes place.

According to one optional embodiment, the lathe includes a second coupling device,
the second coupling device being engageable/disengageable and operating between the guide bush and the frame,
the second coupling device being designed to axially set the position of the guide bush in relation to the frame along said axis of translation and rotation.

According to an optional embodiment, the second coupling device operates radially on a surface of the sheath of the bush such as to set the axial position of the sheath in relation to the frame.

This solution notably has the advantage over the prior art of providing a lathe in which the bush spindle and the gripper or clamping mechanism of the bush can be set in relation to the frame at a relative distance that can very as a function of the type of part to be machined and/or the machining phase of a single part.

According to an optional embodiment, the bush spindle and the gripper or clamping mechanism are linked to the sheath of the bush by a pivoting link, for example by bearings or ball bearings, with an axis of rotation that is coaxial to the axis of translation and rotation of the part.

This solution has the advantage of enabling machining in which the guide bush either rotates freely or is forced to rotate by the moving headstock or by an actuator or motor acting directly on the guide bush. The actuator or motor can be built into the guide bush or be outside same.

According to an optional embodiment, the lathe includes a third coupling device designed to operate between the guide bush and the moving headstock, and the third coupling device is designed to transmit a rotation of the moving headstock to the guide bush. Preferably, the third coupling device is designed to transmit a rotation of a rotary part of the moving headstock to the gripper or clamping mechanism of the bush and/or to the bush spindle.

According to one embodiment, the third coupling device is engageable/disengageable.

According to one embodiment, a portion of the sheath is designed to radially surround an end portion of the moving headstock, notably the rotary part of the moving headstock. The third coupling device includes a protuberance cooperating with an axial slot,
the end portion of the bush spindle including one of either the protuberance or the axial slot, and
the end portion of the moving headstock including the other of the protuberance and said axial slot.

This solution has the advantage of enabling machining using a mode in which the bush spindle and/or the gripper or clamping mechanism of the bush are driven in rotation by the moving headstock.

According to one embodiment, the lathe is an automatic or semi-automatic computer numerical controlled (CNC) lathe.

The invention also relates to a guide bush for a lathe including:
- a bush spindle,
- a gripper or a clamping mechanism, and
- a sheath of the bush at least partially surrounding the bush spindle and/or the gripper or clamping mechanism, the guide bush being designed to operate either in bush mode or in grip mode, said sheath of the bush being designed to be linked to a frame of a lathe notably by a link enabling a translational movement of said sheath of the bush in relation to said frame notably that is substantially axial in relation to the axis of translation and rotation of a part to be machined when same is held by said guide bush, the bush spindle and the gripper or clamping mechanism being designed to be detachable in relation to said sheath, preferably axially.

According to an optional embodiment, the guide bush includes a bush body receiving said bush spindle and said gripper or clamping mechanism, said bush body being designed to be detachable in relation to said sheath, preferably axially.

SHORT DESCRIPTION OF THE FIGURES

Example embodiments of the invention are given in the description, which is illustrated by the attached figures, in which.

DETAILED DESCRIPTION

The invention relates to a lathe having a guide bush with a bushing clamp.

Figure 1:
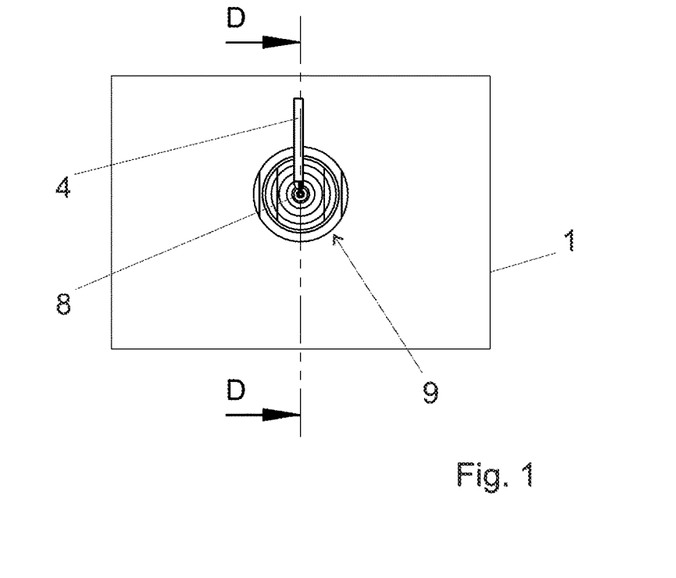
FIG. 1 is a front view of a guide bush linked to a frame of a lathe according to the invention.
Figure 2:
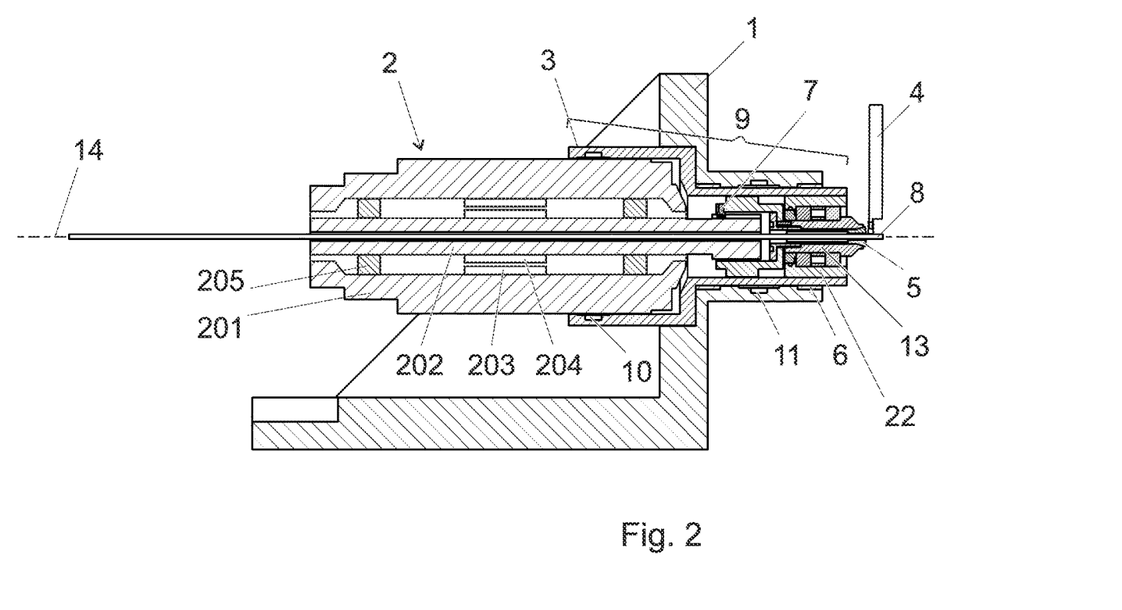
FIG. 2 shows a cross section taken along the line DD in FIG. 1.

FIGS. 1 and 2 show a guide bush 9 linked to a frame 1 of a lathe including a machine tool 4 and a moving headstock 2 designed to rotate a part 8 and to move same forward along an axis 14 of translation and rotation of the part.

The guide bush 9 includes a bush body 22 enveloping a bush spindle 13 that has an internal passage enabling a portion of a part 8 to be machined to be held in said internal passage and to slide therein.

The part to be machined normally has a substantially cylindrical shape. The part 8 may be the shape of a feed bar.

The internal diameter of the passage of the bush spindle 13 is cylindrical and has a diameter that is slightly greater than the diameter of the part to be machined such as to create a bearing surface fitting only a portion of the peripheral surfaces of the part. This passage can then act as a supporting point for the part, while guaranteeing the forward movement of same through the passage. The relationship between this passage and the part to be machined is a sliding pivot link.

The bush body 22 includes a bushing clamp or clamping mechanism 5 designed to apply a clamping force around one or several peripheral portions of the part 8 in order to prevent any movement, in particular axial movement, of the part in relation to the gripper or the clamping mechanism. The gripper or clamping mechanism is designed to operate:
- in closed (or clamped) mode, i.e. the gripper or the clamping mechanism 5 applies a clamping force at least partially around the part 8, said force being sufficient to prevent the relative movement of the part in relation to the bushing clamp, and
- in open (or released) mode, i.e. the gripper or the clamping mechanism 5 does not apply any clamping force to the part 8 to be machined.

The guide bush 9 in FIGS. 1 and 2 is designed to operate:
- in bush mode, i.e. the gripper or clamping mechanism 5 operates in open mode such that the part 8 is guided by the bush spindle 13; the part 8 is thus linked to the guide bush by a sliding pivoting link that enables an axial movement as well as a rotation of the part in relation to the guide bush 9; and
- in grip mode, i.e. the gripper or clamping mechanism 5 operates in closed mode such as to prevent any relative movement of the part in relation to the gripper or clamping mechanism 5; the part 8 is thus linked to the guide bush by a link preventing any axial movement of the part in relation to the guide bush 9.

According to the disclosure, the bush spindle 13 and the bushing clamp 5 can be two separate elements, for example one being positioned axially beside the other. Optionally, the bushing clamp 5 is placed on the side closest to the machining zone in order to hold the part very close to the portion of the part coming into contact with the tool.

Optionally, the bush spindle 13 and the bushing clamp 5 can be combined as a single element designed to operate in bush mode and in grip mode. For example, a bush spindle can thus be provided with bushing clamp functionality by adding a mechanical, electromechanical, hydraulic or pneumatic device that is activatable/deactivatable and that can adjust the internal dimensions of some or all of the internal passage of the bush spindle.

In the example in FIGS. 1 and 2, an end portion of the bush spindle 13 is provided with an activatable/deactivatable clamping mechanism 5 that is designed to operate as a bushing clamp. This clamping mechanism 5 makes it possible, when commanded, to reduce the internal diameter of the passage of the bush spindle 13 in order to clamp the part 8 such as to prevent any movement of this latter in relation to the clamping mechanism 5 and in relation to the bush spindle 13.

The guide bush 9 includes a sheath 3 of the bush that radially surrounds the bush body 22 which radially and at least partially surrounds the bush spindle 13 and the clamping mechanism 5. The bush body 22 and the sheath 3 are designed to prevent any translational movement and any rotation of the bush body 22 in relation to the sheath 3 of the bush, when the bush body 22 is in an operational position.

The sheath 3 is linked to the frame 1 by a link enabling same to move in relation to the frame substantially axially in relation to the axis 14 of translation and rotation of the part. The link may be a sliding link or a sliding pivoting link.

The sheath 3 of the bush may be linked to the frame by means of a plurality of bearings that only enable an axial translational movement of the sheath 3 in relation to the frame 1 (sliding link).

Figure 6:
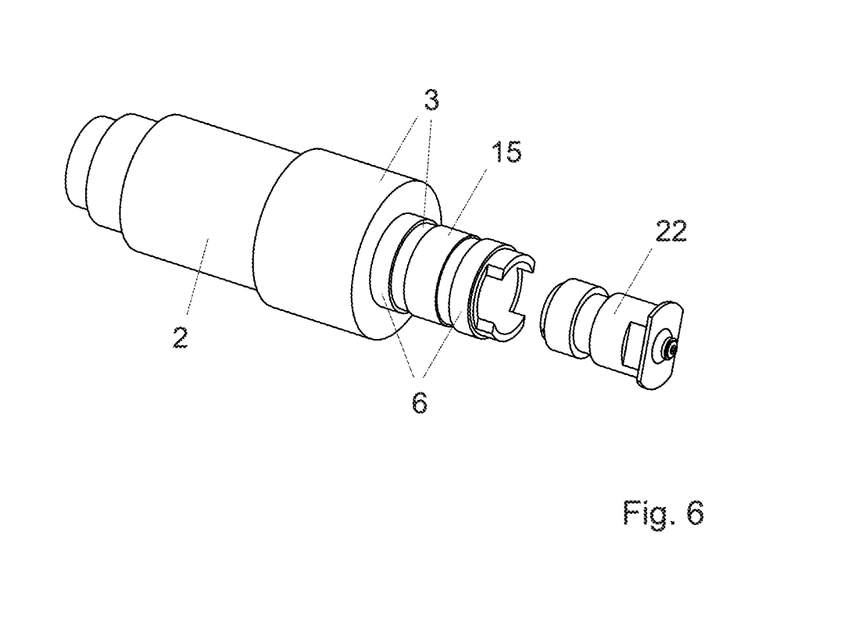
FIG. 6 shows details of a surface of the sheath of the guide bush and of the detachable bush body, according to the invention.
Figure 11:
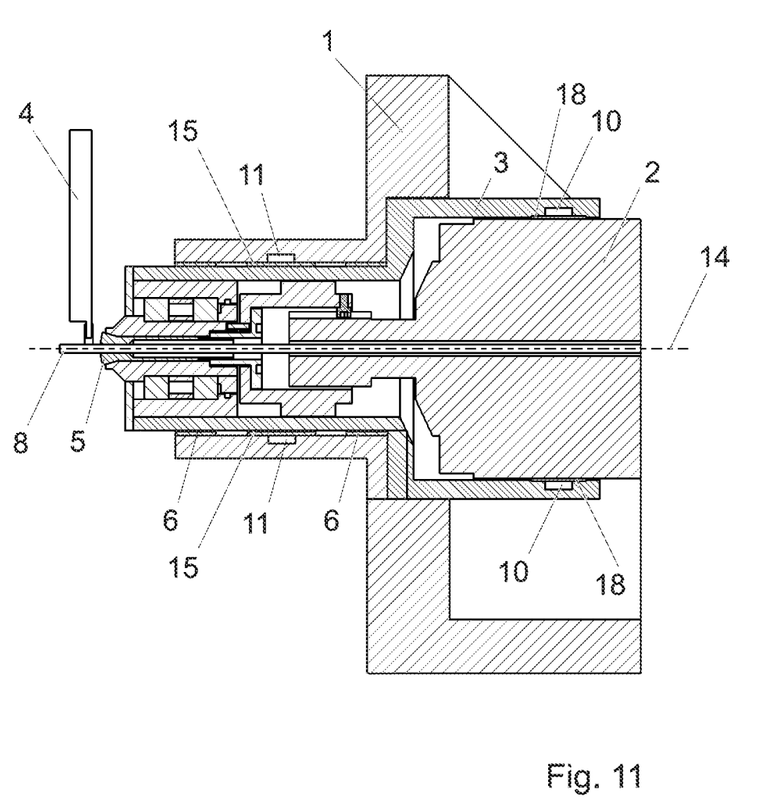
FIGS. 11 and 12 show the steps of a machining method with closed bushing clamp, according to the invention.
Figure 12:
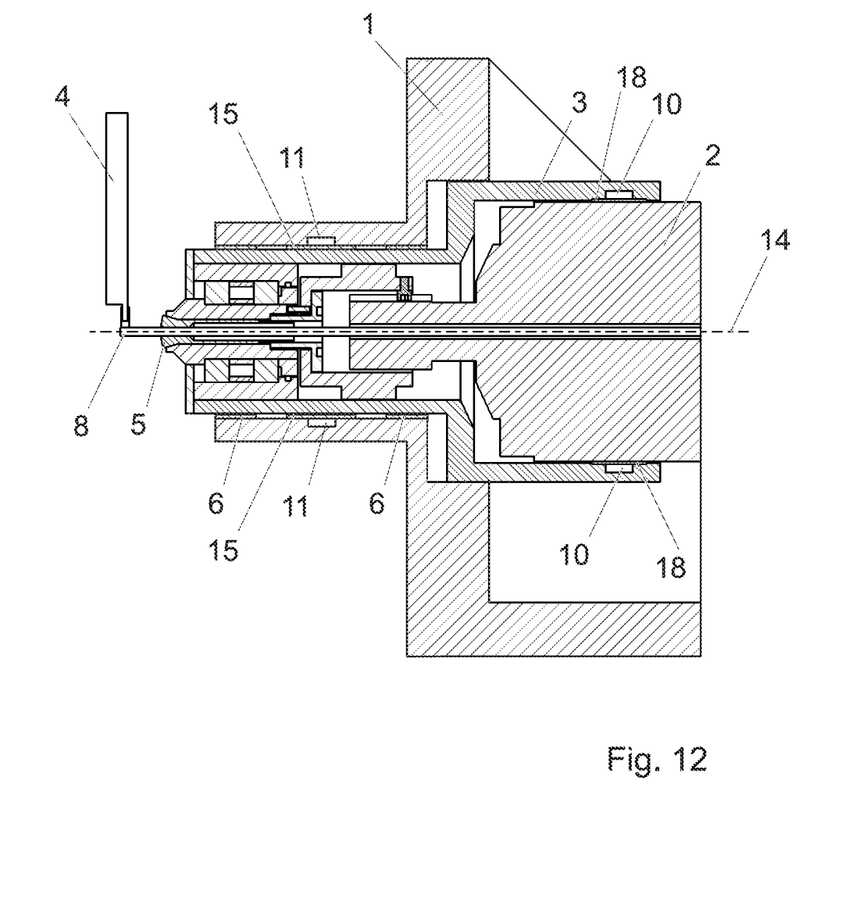

A pair of ring-shaped bearings 6 that can be placed around the peripheral surfaces of the sheath 3 of the bush are notably shown in the illustrations in FIGS. 6,11 and 12.

Figure 3:
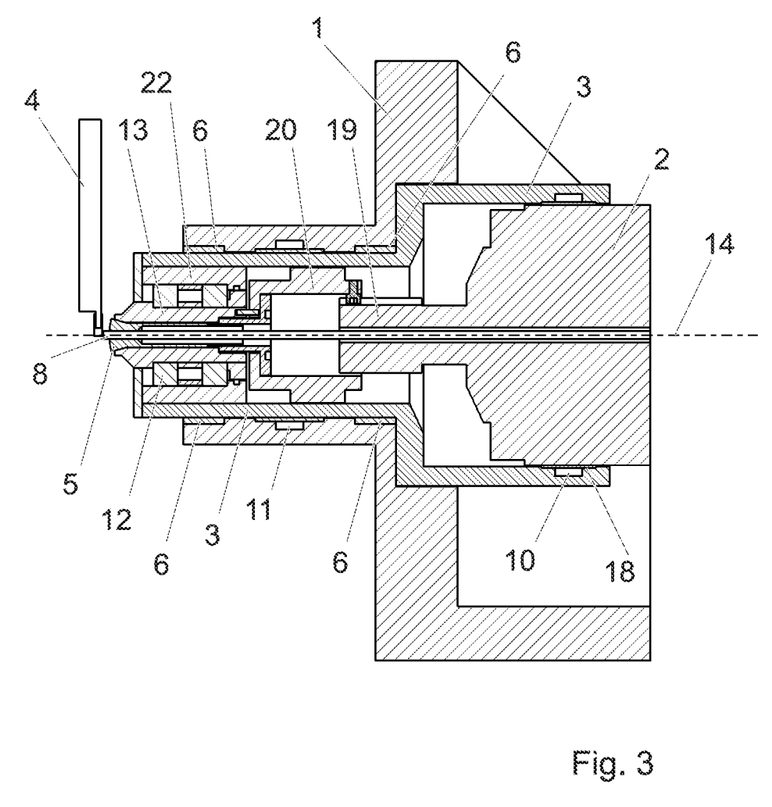
FIG. 3 is a detailed view of the bushing clamp and of the bush spindle according to the invention.
Figure 4:
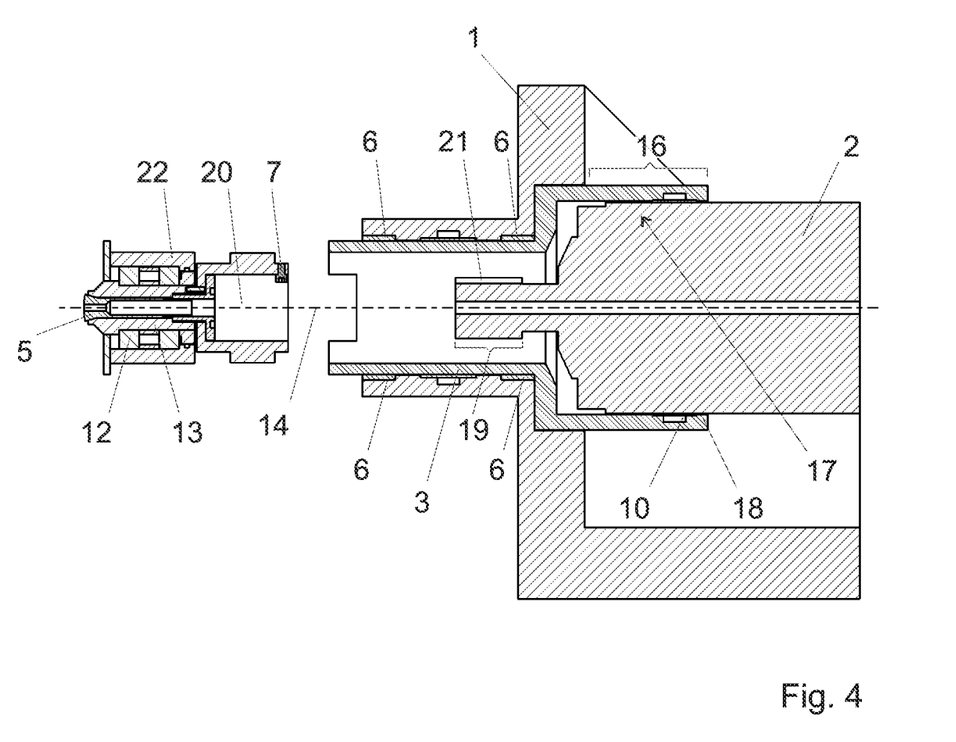
FIG. 4 illustrates removal of the detachable bush body including the bushing clamp and the bush spindle from the frame, according to the invention.
Figure 5:
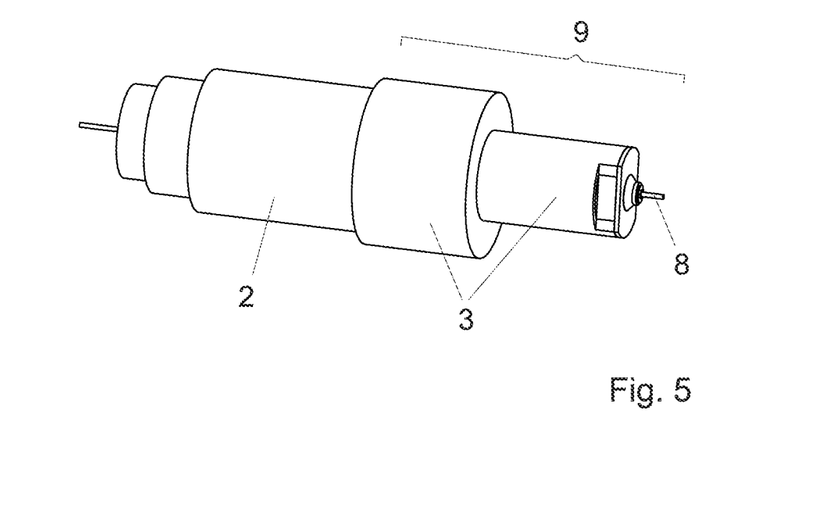
FIG. 5 shows the guide bush partially surrounding one end of the moving headstock, according to the invention.

Alternatively, a pair of ring-shaped bearings 6 can be attached to a portion of the frame such as to surround a portion of the peripheral surfaces of the sheath 3 of the bush, when this latter is inserted operationally into the frame. This variant is shown in particular in FIGS. 3-5.

The bush spindle 13 and the clamping mechanism 5 are connected to the bush body 22 by means of a link enabling rotation of the bush spindle 13 and of the clamping mechanism 5 seated in the bush spindle 13 in relation to the bush body 22, in particular in relation to the sheath 3 when the bush body 22 is in the operational position. The link may be a pivoting link with an axis of rotation that is coaxial to the axis 14 of translation and rotation.

In the embodiment shown in FIGS. 1-4, the bush body 22 holds the assembly formed by the bush spindle 13 and the clamping mechanism 5 by means of a plurality of ball bearings 12.

This solution has the advantage of enabling machining in which the bush spindle 13 and the clamping mechanism 5 either rotate freely or are driven in rotation by the moving headstock via a rotation of the part. When the guide bush 9 is in grip mode, the part 8 is linked to the guide bush by a pivoting link preventing an axial movement of the part in relation to the sheath 3 of the bush while enabling a rotation of the part in relation to the sheath 3 of the bush.

The guide bush can be motorized to drive the bush spindle 13 and the clamping mechanisms in rotation.

Alternatively, the guide bush can be designed to drive the bush spindle 13 and the clamping mechanism 5 in rotation by means of a geartrain and/or motor or external actuator. The actuator or motor can be attached to the frame and, by means of a transmission system, transmit the rotary movement to the bush spindle 13 and to the clamping mechanisms.

These solutions have the advantage of enabling machining in which the bush spindle or clamping mechanism are driven in rotation by the actuator or motor.

The moving headstock 2 may comprise an external part 201 and a rotary part 202 surrounding a portion of the part 8 to be machined and designed to rotate the part to be machined.

The parts 201, 202 of the moving headstock are linked by a pivoting link enabling a rotation of the rotary part 202 in relation to the external part 201. The pivoting link can be provided by a plurality of (roller) bearings 205, for example ball bearings.

The moving headstock can be motorized, for example using an actuator or a motor 203, 204. For the sake of simplicity in the illustrations, the moving headstock 2 is represented in the remainder of the illustrations succinctly and with out detail of the rotary part 202 and the external part 201.

Optionally, all or at least a part of the guide bush including the bush spindle and/or the gripper or mechanism of the bush is designed to be detachable from the frame. Preferably, all or said part of the guide bush is detachable axially along the axis of translation and rotation of the part, preferably from the side of the frame that is oriented towards the machining zone, i.e. towards the working position of the tool or tools of the lathe.

In the embodiments shown in FIGS. 1-12, the bush body 22 is designed to be detachable from the frame 1, and in particular to be detachable from the sheath 3 of the bush. Preferably and as shown in the illustrations in FIGS. 4 and 6, the bush body 22 is designed to be detachable axially in the direction of the machining zone.

The guide bush is provided with a coupling mechanism enabling a coupling between the sheath 3 of the bush and the bush body 22 holding the bush spindle 13 and the clamping mechanism 5. This coupling is intended to prevent, when operational, an axial translational and rotational movement of the bush body 22 in relation to the sheath 3 of the bush, as well as to enable, when not operational, the bush body 22 to come out of the sheath 3 of the bush.

Optionally, this coupling can be activated/deactivated on the side of the frame 1 that is oriented towards the machining zone, i.e. towards the working position of the tool or tools of the lathe.

The bush body 22 can be linked to the sheath 3 via a plurality of detachable attachment elements, for example screws (not shown in the figures). Optionally, the detachable attachment elements are accessible from the side of the frame that is oriented towards the machining zone, i.e. towards the working position of the tool or tools of the lathe.

One of the advantages of this lathe arising from the modularity of the operational part of the guide bush 9 is the ability to quickly change the bush spindle 13 and/or the clamping mechanism 5, notably as a function of the type of machining, the type of part to be machined and/or the machining sequence. For example, a bush spindle 13 and a clamping mechanism 5 can be chosen from a wide range of different spindles and clamping mechanisms, each having different technical characteristics. In particular, a bush spindle 13 can be selected in order to satisfy the requirements relating to the size (diameter, length) of the part or feed bar, while a clamping mechanism 5 can be selected to satisfy the requirements relating to the type of material (rigidity, density, elasticity) of the part to be machined.

The lathe includes a first engageable/disengageable coupling device operating between the moving headstock 2 and the guide bush 9, notably between the moving headstock 2 and the bush spindle 13, in order to axially couple the moving headstock 2 with the guide bush 3, notably to axially couple the moving headstock 2 and the bush spindle 13 including the clamping mechanism 5.

According to the disclosure, "engageable/disengageable coupling device" means a coupling device designed to operate in:
  engaged mode, in which the coupling device provides a coupling between two separate entities, which then move together as a single entity, and
  disengaged mode in which the coupling device does not provide any coupling between said two entities, thereby ensuring that the movement of each of said entities is independent of the other.

Optionally, the operating mode of an engageable/disengageable coupling device is changed by an actuating mechanism or device.

According to the disclosure, an actuating mechanism or device for an engageable/disengageable coupling device may be positioned inside or outside the guide bush. Optionally, this actuating mechanism or device can be controlled automatically or semi-automatically by the operator.

According to the example in FIGS. 1-6, an end portion 16 of the sheath 3 radially surrounds an end portion 17 of the moving headstock, notably the external part 201 of the moving headstock 2.

Optionally, the end portion 16 of the sheath 3 is designed to always surround radially at least one part of the end portion 17 of the moving headstock, when the headstock moves or moves backwards axially in relation to the sheath 3 of the bush in order to move the part to be machined 8 forward.

The end portion 16 of the sheath 3 and the end portion 17 of the moving headstock are optionally designed to hold the angular position of the external part 201 of the moving headstock static in relation to the sheath.

The first coupling device includes a braking device 10 that is designed to operate between this end portion 16 of the sheath of the bush and this end portion 17 of the moving headstock.

Optionally, the braking device 10 can operate radially on a surface of this end 17 of the moving headstock such as to hold the axial position of the moving headstock static in relation to the sheath.

The surface 18 can be a dedicated surface for this function and take the form of an axially elongate strip on the surface of the end portion 17 of the moving headstock in order to enable a coupling between the sheath of the bush and the moving headstock regardless of the axial position of the moving headstock in relation to the sheath of the bush.

Optionally, the shape and/or material of this surface is selected such as to ensure an efficient and effective action of the braking device 11 on this surface.

Optionally, the first coupling device includes a plurality of braking devices 10 acting on a plurality of surfaces of the moving headstock 2. Optionally, these devices are located around the surface 18 at angularly equidistant or opposing positions in relation to one another.

The second coupling device may include surface portions 18 of the sheath of the bush 3 that are movable in relation to the sheath and designed to come into contact with the surface portions of the moving headstock 2 in order to perform a coupling action between the guide bush 9 and the moving headstock 2.

Alternatively, the first coupling device may include other means enabling coupling between the sheath of the bush 3 and the moving headstock 2, notably indexed coupling means (for example pins).

The lathe includes a second engageable/disengageable coupling device that operates between the guide bush 9 and the frame 1, notably between the sheath 3 of the bush and the frame 1. The second coupling device is designed to axially set the position of the guide bush 9 in relation to the frame 1.

According to an embodiment in FIGS. 6, 11 and 12, the second coupling device includes a braking device 11 that is designed to operate radially on a surface 15 of the sheath 3 of the bush such as to keep the axial position and the angular position of the sheath of the bush 3 static in relation to the frame 1. According to one embodiment, the second coupling device is also designed to hold the angular position of the sheath of the bush 3 static in relation to the frame 1 (in the case of a sliding pivoting link linking the sheath to the frame).

Optionally and as shown in FIG. 6, the surface 15 is ring shaped and radially surrounds a portion of the sheath of the bush in order to enable coupling between the sheath 3 of the bush and the frame 1 regardless of the angular position of the sheath of the bush 3 in relation to the frame 1.

Optionally, the shape and/or material of the surface 15 is selected such as to ensure an efficient and effective action of the braking device 11 on this surface.

Optionally, the second coupling device includes a plurality of braking devices 11 acting on the same surface 15. Optionally, these devices are located around the surface 15 at different positions, notably angularly equidistant or opposing in relation to one another.

According to another embodiment, the second coupling device includes surface portions 15a of the frame that are movable in relation to the frame and designed to come into contact with the surface portions of the sheath 3 of the bush in order to effect a coupling action between the guide bush 9 and the frame 1. This embodiment is notably shown in FIGS. 5 and 7-10.

Alternatively, the second coupling device may include other device enabling coupling between the two parts, notably indexed coupling device (for example pins). The lathe includes a third coupling device designed to operate between the whole or a portion of the guide bush 9 and the moving headstock 2 in order to transmit a rotation of the moving headstock 2 to the whole or a portion of the guide bush 9.

The third coupling device shown in FIGS. 1-4 is designed to transmit a rotation of the rotary part 202 of the moving headstock 2 to the spindle 13 including the clamping mechanism 5.

According to one embodiment, an end portion 20 of the bush spindle 13 is linked to an end portion 19 of the rotary part 202 of the moving headstock 2 by a sliding link, which guarantees an axial movement of the moving headstock 2 in relation to the bush spindle 13.

According to the embodiment shown in FIGS. 1-4, the end portion 20 of the spindle 13 of the bush is designed to radially surround the end portion 19 of the rotary part 202 of the moving headstock 2. The end portion 20 of the spindle 13 of the bush includes a protuberance 7 cooperating with an axial slot 21 of the end portion 19 of the moving headstock. This protuberance/axial-slot link ensures transmission of a rotation of the moving headstock to the bush spindle 13 and to the clamping mechanism 5, while enabling an axial movement of the moving headstock 2 in relation to the assembly formed by the bush spindle 13 and the clamping mechanism 5.

The third coupling device operates continuously while the bush body 22 is linked to the bush sheath 3 in an operational position and the moving headstock is in a position holding a part to be machined 8 or moving same forward.

According to another embodiment, the bush spindle 13, including the clamping mechanism 5, is linked to the rotary part 202 of the moving headstock 2 by means of a system of gearwheels, for example acting simultaneously on a toothed surface of the rotary part 202 of the moving headstock 2 and on a toothed surface of the bush spindle 13 and/or of the clamping mechanism 5.

According to one embodiment, the third coupling device can be engageable/disengageable.

FIGS. 7-10 show the steps of a method for moving the part or the feed bar 8 forward, notably including steps performed in concurrent operation time.

Figure 7:
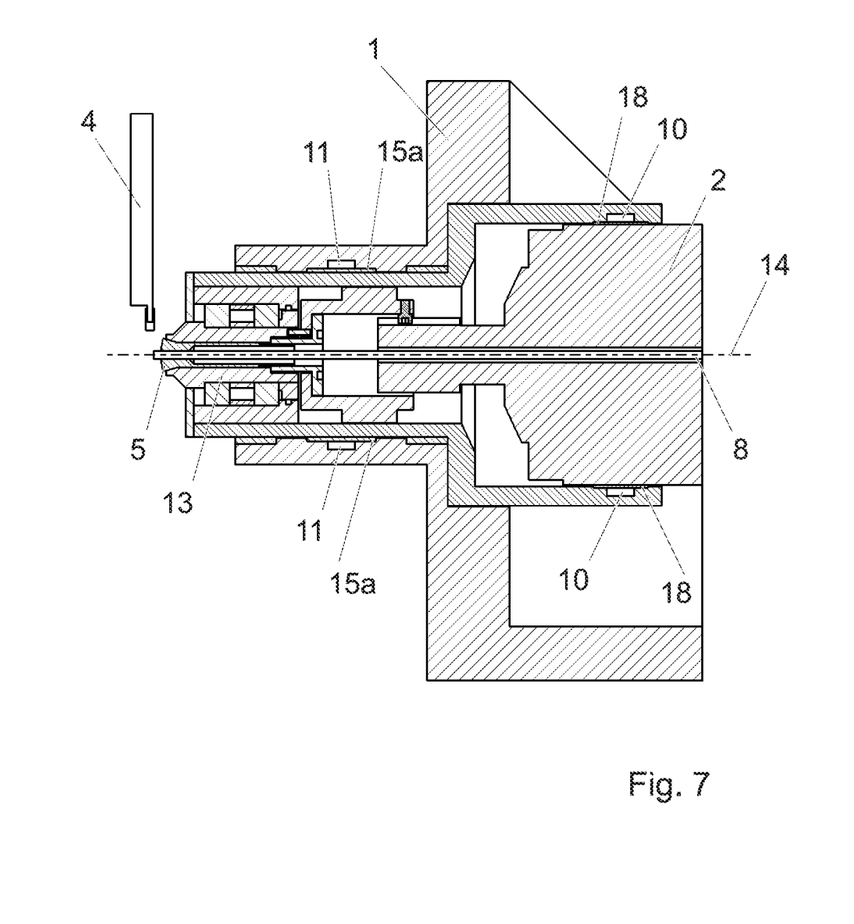
FIGS. 7-10 show the steps of a method for moving the feed bar forward, according to the invention.

FIG. 7 shows a machining step for the part 8 in which:
the part 8 is held by the moving headstock 2 in a withdrawn axial position and is supported by the guide bush 9 in bush mode,
the first coupling device is disengaged (no axial coupling between the guide bush and the moving headstock), the braking devices 10 of the sheath 3 of the bush do not act on the surfaces 18 of the moving headstock, the second coupling device is engaged (coupling between the bush sheath and the frame), the braking devices 11 of the frame 1 act on the surfaces 15 of the sheath 3 of the bush.

Figure 8:
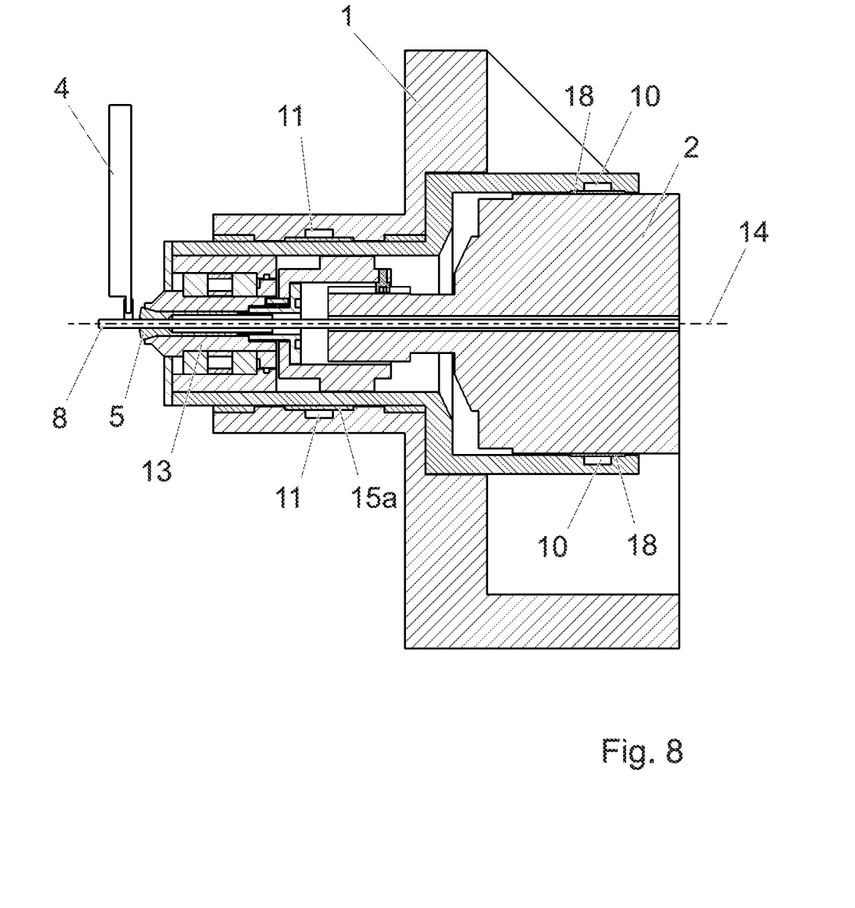

FIG. 8 shows the following step in which the part 8 is moved axially by the moving headstock 2 to a position enabling the part 8 to be machined.

Figure 9:
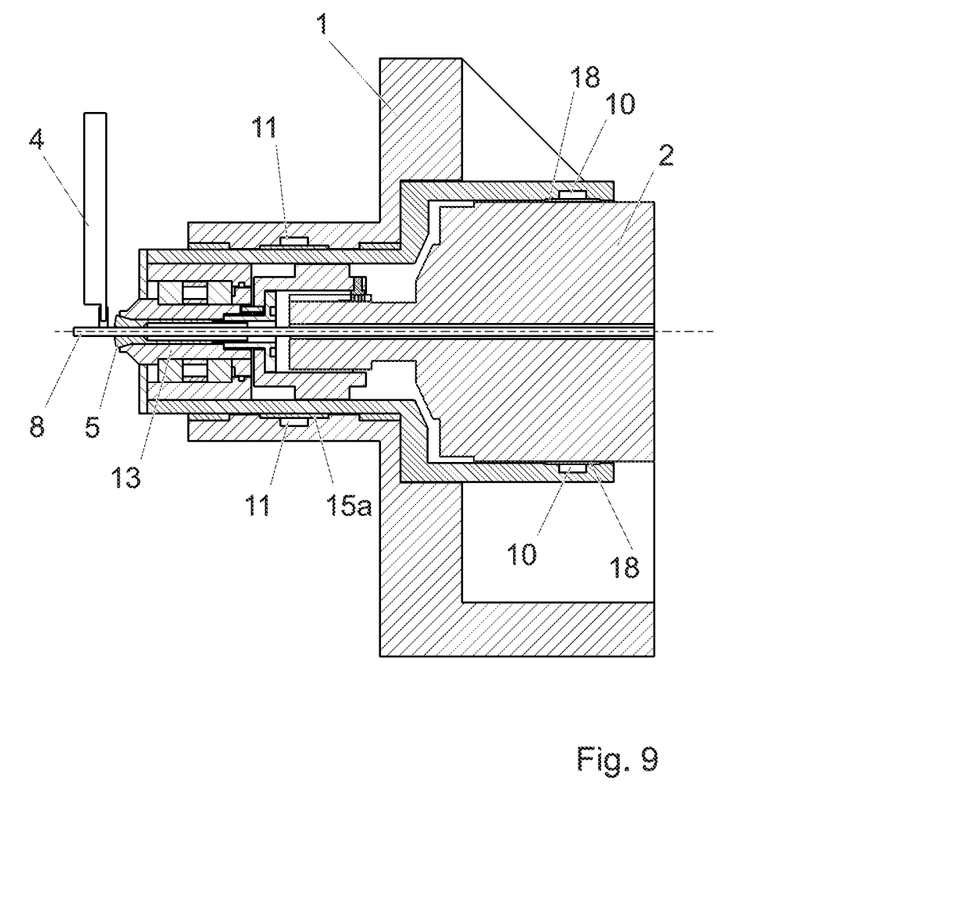

FIG. 9 shows the following step in which the part 8 is guided by the guide bush 9 in bush mode and machined by the tool 4.

The angular position and the rotation of the part during the forward movement and machining thereof are determined by the moving headstock.

FIG. 10 shows a finishing or cutting step for the machined part 8 in which:
the part 8 is now held by the guide bush 9 in grip mode,
the moving headstock no longer holds the bar 8 and is thus free to move axially to a withdrawn position in order to start a new procedure for moving the part or the feed bar 8 forward, as described above and illustrated by FIGS. 7-10.

Figure 10:
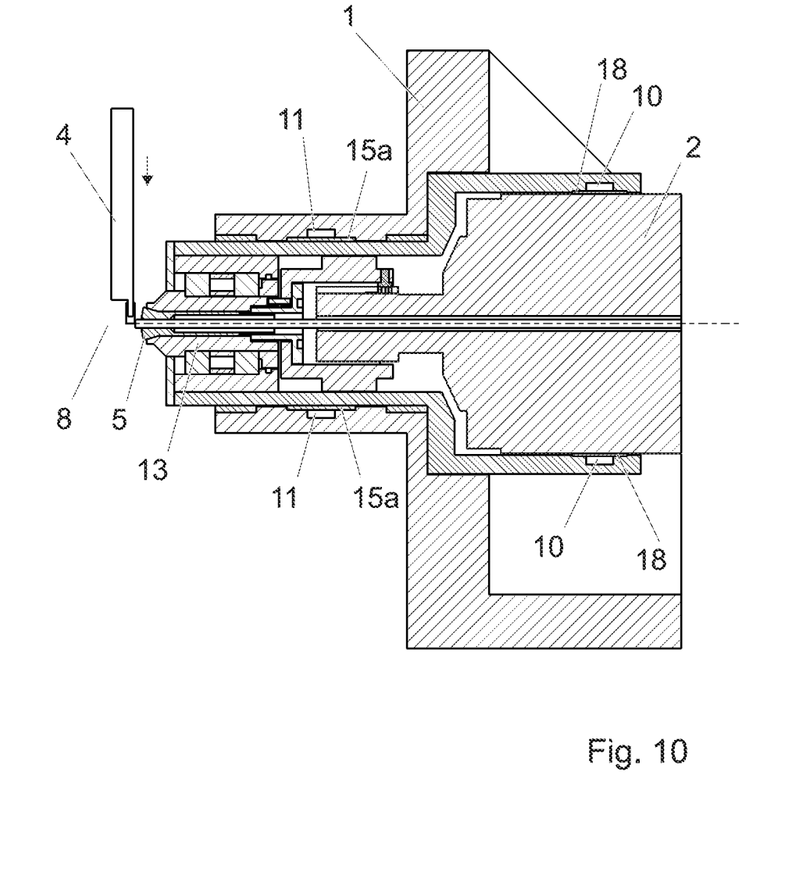

Optionally, a movement of the moving headstock to the withdrawn position during the part cutting operation enables execution of this step in concurrent operation time.

FIGS. 11 and 12 show the steps of a machining method for a part to be machined 8 that is held by a guide bush 9 in grip mode.

FIG. 11 shows a machining step for the part 8 in which:
the part 8 is held by the moving headstock 2 and by the guide bush 9 in grip mode,
the first coupling device is engaged, axially coupling the bush body 22 with the moving headstock 2: the braking devices 10 of the sheath 3 of the bush act on the surfaces 18 of the moving headstock such as to hold the relative position between the moving headstock and the bush body 22 static,
the second coupling device is disengaged (no axial coupling between the bush sheath and the frame), the braking devices 11 of the frame 1 do not act on the surfaces 15 of the sheath 3 of the bush.

The parts can thus be driven in axial movement (forwards and/or backwards), in rotation and positioned angularly in relation to the frame of the bush by a joint action of the bush body 22 (notably of the clamping mechanism 5) and of the moving headstock 2. The bush body 22 and the moving headstock 2 work as a single gripping element for the part 8 to be machined.

An axial movement action of the bush body 22 is guided by the action of the moving headstock 2 by means of an axial movement of the sheath 3 determined by the first coupling device.

A rotary action of the bush spindle 13 including the clamping mechanism 5 is guided by the action of the moving headstock 2 by means of the third coupling device operating between the end portion 20 of the bush spindle and the end portion 19 of the rotary part 202 of the moving headstock 2.

A joint gripping of the part by the clamping mechanism 5 and the moving headstock 2 helps to reduce the radial play between the guide bush and the part, which enables more precise machining of the part.

In one embodiment, when finishing the machining of the part with the bush operating in grip mode, the moving headstock 2 is moved to a withdrawn position concurrently in order to prepare execution of a forward movement operation of the part to be machined (through the feed bar) for a new machining cycle.

The fact that the lathe is provided with a guide bush that can be operated in bush mode or in grip mode while the bush body 22 (including the bush spindle 13 and the clamping mechanism 5) can either be driven axially by the moving headstock or axially static in relation to the frame enables a wide range of different machining types.

These different machining types include typical machining techniques for bar lathes/turning machines, such as:
machining of the part by means of a guide bush in bush mode that is static in relation to the frame as well as with a continuous forward movement of the part, notably with a withdrawal operation of the moving headstock implemented in concurrent operation time,
machining of the part with the guide bush in bush mode that is static in relation to the frame as well as with a discrete forward movement of the part, notably with a withdrawal operation of the moving headstock implemented in concurrent operation time.

These different machining types include typical machining techniques for precision lathes, such as:
machining of the part with the guide bush in grip mode including a single separate forward movement of the part, notably with a withdrawal operation of the moving headstock implemented in concurrent operation time,
machining of the part with the guide bush in grip mode including a plurality of separate/discrete forward movements of the part, notably with a withdrawal operation of the moving headstock implemented in concurrent operation time,
machining of the part with the guide bush in grip mode including one or more two-directional axial movements of the part.

The fact that the lathe is provided with a guide bush that can be operated in bush mode or in grip mode while the bush spindle and the clamping mechanism can either be driven axially by the moving headstock or axially static in relation to the frame also enables the type of machining to be changed during a machining operation of the same part.

The lathe enables a wider range of machining operations than the prior art in machining, notably enabling a combination of different machining types.

For example, machining of a part in bush mode may be followed by an operation in grip mode, for example in order to execute a transverse piercing operation to form a radial orifice on a surface of the part.

Unlike the machining type, the tool 4 or a plurality of machining tools can be designed to operate on a surface of the part 8 in a predetermined static axial position in relation to the frame.

Unlike the machining type, the tool 4 or a plurality of machining tools can be designed to operate on a surface of the part 8 by moving axially along the axis of translation and rotation of the part 8.

REFERENCE NUMBERS USED IN THE FIGURES

1 Frame
2 Moving headstock
201 External part of the moving headstock
202 Rotary part of the moving headstock
203-4 Motor
205 Roller bearing
3 Sheath of the bush
4 Tool
5 Clamping mechanism 6 Bearing
7 Tab
8 Part to be machined
9 Guide bush
10 Bush/headstock brake
11 Bush/frame brake
12 Roller bearing
13 Bush spindle
14 Axis of translation and rotation of the part
15 Braking surface
15a Surface portions of the frame
16 End portion of the sheath of the bush
17 End portion of the moving headstock
18 Braking surface
19 End portion of the moving headstock
20 End portion of the bush spindle
21 Slot
22 Bush body

What is claimed is:

1. A lathe including:
   a moving headstock designed to ensure the rotation and translation of a part to be machined in relation to an axis of translation and rotation; and
   a guide bush designed to be attached to a frame of the lathe and including:
      a bush spindle, and
      a clamping mechanism,
   the guide bush being designed to operate either in bush mode or in grip mode, wherein:
      the guide bush is designed to be moveable axially in relation to the frame along said axis,
      the lathe is designed to operate in a first mode in which the guide bush is driven axially by the moving headstock, and
      the lathe is designed to operate in a second mode in which the axial position of the guide bush is static in relation to the frame.

2. The lathe as claimed in claim 1, wherein the lathe has a first coupling device, wherein said first coupling device is engageable/disengageable and operating between the guide bush and the moving headstock, and wherein said first coupling device is designed to axially couple the guide bush and the moving headstock along said axis.

3. The lathe as claimed in claim 1, wherein the lathe further has a second coupling device, wherein said second coupling device is engageable/disengageable and operating between the guide bush and the frame, and wherein said second coupling device is designed to axially set the position of the guide bush in relation to the frame along said axis.

4. The lathe as claimed in claim 1, wherein said guide bush includes a sheath of the bush at least partially surrounding at least one of the bush spindle and the clamping mechanism, wherein said sheath of the bush is designed to be linked to the frame by means of a link that enables an axial translational movement of said sheath of the bush in relation to the frame.

5. The lathe as claimed in claim 4, wherein said link includes bearings designed to enable said axial translational movement of the sheath of the bush in relation to the frame.

6. The lathe as claimed in claim 4, wherein the lathe has a first coupling device, wherein said first coupling device is engageable/disengageable and operating between the guide bush and the moving headstock, wherein said first coupling device is designed to axially couple the guide bush and the moving headstock along said axis, wherein an end portion of the sheath is designed to radially surround an end portion of the moving headstock, and wherein said first coupling device is designed to operate between said end portion of the sheath of the bush and said end portion of the moving headstock.

7. The lathe as claimed in claim 6, wherein said first coupling device includes a braking device that is designed to operate radially on a surface of said end of the moving headstock such as to maintain an axial position of the moving headstock in relation to the sheath.

8. The lathe as claimed in claim 3, wherein said second coupling device included a braking device that is designed to operate radially on a surface of the sheath of the bush such as to set an axial position of the sheath in relation to the frame.

9. The lathe as claimed in claim 1, wherein the bush spindle and the clamping mechanism are linked to said sheath of the bush by a link having an axis of rotation that is coaxial with said axis.

10. The lathe as claimed in claim 9, wherein the link includes roller bearings.

11. The lathe as claimed in claim 1, wherein the lathe further includes a third coupling device designed to operate between the guide bush and the moving headstock, and wherein said third coupling device is designed to transmit a rotation of a rotary part of the moving headstock to the clamping mechanism of the bush and/or to the bush spindle.

12. The lathe as claimed in claim 11, said third coupling device being engageable/disengageable.

13. The lathe as claimed in claim 11, wherein an end portion of the bush spindle is designed to radially surround an end portion of said rotary part of the moving headstock, wherein said third coupling device includes a protuberance that cooperates with an axial slot, wherein the end portion of the bush spindle includes one of either said protuberance or said axial slot, and wherein said end portion of said rotary part of the moving headstock includes the other of said protuberance and said axial slot.

14. The lathe as claimed in claim 11, wherein said moving headstock is motorized.

15. The lathe as claimed in claim 1, wherein the guide bush is motorized.

16. The lathe as claimed in claim 1, wherein the bush spindle and the clamping mechanism are designed to be axially detachable from the frame and/or the sheath of the bush.

17. The lathe as claimed in claim 16, wherein the guide bush includes a bush body, said bush body radially enveloping the bush spindle and the clamping mechanism, and said bush body being designed to be axially detachable from the frame and/or the sheath of the bush.

18. The lathe as claimed in claim 16, wherein the whole of the guide bush is designed to be axially detachable from the frame.

19. The lathe as claimed in claim 17, wherein the whole of at least one of the bush and the bush body and the bush spindle and clamping mechanism are designed to be detachable from the side of the frame close to the machining zone.

20. The lathe as claimed in claim 1, the bush spindle receiving and holding said clamping mechanism.

21. A guide bush for a lathe including:
    a bush spindle;
    a clamping mechanism; and
    a sheath of the bush at least partially surrounding at least one of the bush spindle and the clamping mechanism,
    wherein the guide bush is designed to operate either in bush mode or in grip mode, wherein said sheath of the bush is designed to be linked to a frame of a lathe by a link enabling a translational movement of said sheath of the bush in relation to said frame that is substantially axial in relation to an axis of translation and rotation of a part to be machined when same is held by said guide bush, and wherein the bush spindle and the clamping mechanism are designed to be detachable from said sheath, axially in relation to said axis, wherein said guide bush further includes a bush body, said bush body radially enveloping the bush spindle and the clamping mechanism, and wherein said bush body is designed to be detachable in relation to said sheath, axially in relation to said axis.

22. The guide bush as claimed in claim 21, wherein said bush body is linked to said sheath via a plurality of detachable attachment elements which are accessible from the side of the machining zone.

\* \* \* \* \*